United States Patent [19]

Nohira et al.

[11] 4,308,837
[45] Jan. 5, 1982

[54] INTAKE SYSTEM OF AN INTERNAL COMBUSTION ENGINE

[75] Inventors: Hidetaka Nohira, Mishima; Toshiaki Konomi; Hideaki Matsui, both of Susono, all of Japan

[73] Assignee: Toyota Jidosha Kogyo Kabushiki Kaisha, Toyota, Japan

[21] Appl. No.: 26,753

[22] Filed: Apr. 3, 1979

[30] Foreign Application Priority Data

May 22, 1978 [JP] Japan ............................ 53/59895
May 22, 1978 [JP] Japan .......................... 53/67711[U]

[51] Int. Cl.³ ............................................. F02M 7/18
[52] U.S. Cl. ................................. 123/442; 123/52 M; 123/336; 123/337; 261/41 D; 261/65
[58] Field of Search ............. 123/52 M, 75 B, 117 A, 123/122 H, 442, 336, 337, 59 PC, 308, 432; 261/41 D, 65

[56] References Cited

U.S. PATENT DOCUMENTS

| | | | |
|---|---|---|---|
| 1,902,603 | 3/1933 | Wilson | 261/41 D |
| 2,228,733 | 1/1941 | Reichhelm | 123/442 |
| 2,436,319 | 2/1948 | Meyer | 261/65 |
| 2,473,808 | 6/1949 | Mallory | 123/122 H |
| 3,171,395 | 3/1965 | Bartholomew | 123/52 M |
| 3,410,539 | 11/1968 | Walker | 261/65 |
| 3,678,905 | 7/1972 | Diehl | 123/75 B |
| 4,095,565 | 6/1978 | Noguchi | 123/75 B |
| 4,186,706 | 2/1980 | Matsumoto | 123/127 |
| 4,194,474 | 3/1980 | Endo | 123/75 B |

Primary Examiner—Ira S. Lazarus
Assistant Examiner—Carl Stuart Miller
Attorney, Agent, or Firm—Kenyon & Kenyon

[57] ABSTRACT

An internal combustion engine comprising a carburetor having a throttle valve. A secondary throttle valve is arranged in the intake passage at a position located downstream of the throttle valve of the carburetor. When the engine is operating under a light load, the secondary throttle valve remains fully closed. When the engine is operating under a heavy load, the secondary throttle valve remains fully opened. The intake passage located upstream of the secondary throttle valve is interconnected with the intake passage located downstream of the secondary throttle valve via an auxiliary intake passage having a cross-sectional area which is extremely smaller than that of the intake passage.

7 Claims, 7 Drawing Figures

INTAKE SYSTEM OF AN INTERNAL COMBUSTION ENGINE

DESCRIPTION OF THE INVENTION

The present invention relates to an intake system of an internal combustion engine.

Particularly in a gasoline engine, in order to obtain a high output power of the engine by increasing the volumetric efficiency when the engine is operating at a high speed under a heavy load, the shape of each intake port is so constructed that the intake port has as small a flow resistance as possible. In the case wherein the intake port has such a shape, since a considerably strong turbulence is spontaneously created in the combustion chamber of the engine when the engine is operating at a high speed under a heavy load, the burning velocity is sufficiently increased. However, when the same engine is operating at a low speed, a satisfactory strong turbulence is not created in the combustion chamber, thus resulting in the problem that a sufficient increase in the burning velocity is not obtained.

As a method of creating a strong turbulence in the combustion chamber when an engine is operating at a low speed, there is a method of forcedly creating a swirl motion in the combustion chamber by using a helically-shaped intake port or by using a shroud valve. However, in the case wherein such a method is adopted, since the flow resistance to which the mixture fed into the cylinder is subjected is increased, there occurs a problem in that the volumetric efficiency is reduced when the engine is operating at a high speed under a heavy load. Consequently, in order to increase the burning velocity when an engine is operating at a low speed while ensuring a high volumetric efficiency when the engine is operating at a high speed under a heavy load, it is necessary to form each intake port so that it has as small a flow resistance as possible and, at the same time, to create a strong turbulence in the combustion chamber when the engine is operating at a low speed.

In addition, as a method of improving combustion when an engine is operating at a low speed under a light load, there is a method of promoting the vaporization of fuel, in addition to a method of creating a strong turbulence in the combustion chamber. That is, when an engine is operating at a low speed under a light load, the velocity of air flowing in the venturi of the carburetor is low. Consequently, since the relative speed between the fuel injected from the fuel nozzle and the air flowing in the venturi is small, it is impossible to atomize the liquid fuel fully into fine particles. As a result of this, a large amount of the fuel is fed into the cylinder in liquid form, and good combustion cannot be obtained.

In order to avoid the above-mentioned problems, an engine has been proposed in which the intake passage comprises a main intake passage having a relatively large cross-section and auxiliary intake passages, each having a relatively small cross-section. Each of the auxiliary intake passages opens into a respective intake port defining a part of the main intake passage. In this engine, the mixture is fed into the combustion chamber from each auxiliary intake passage via its respective intake port when the engine is operating under a light load, while the mixture is fed into each combustion chamber from the main respective intake passage via the intake port when the engine is operating under a heavy load. In this engine, it is intended that the flow velocity of the mixture be increased for promoting the vaporization of fuel by feeding the mixture into each combustion chamber via the respective auxiliary intake passage having a relatively small cross-section, when the engine is operating under a light load. However, at the time of the intake stroke when the engine is operating under a light load, the amount of the mixture which is actually fed from each auxiliary intake passage into its intake port and then into the respective combustion chamber is extremely small. This is because, since the intake manifold has a relative large volume, a part of the mixture located in the intake manifold is sucked into each combustion chamber via its intake port at the time of the corresponding intake stroke. In addition, since the intake port of a given cylinder which is in the intake stroke is in communication with the intake ports of the remaining cylinders, the mixture is sucked into the combustion chamber of the given cylinder from the auxiliary intake passages of the remaining cylinders via the intake manifold when the given cylinder is in the intake stroke. As mentioned above, since the mixture located in the intake manifold and the mixture fed into the intake ports of the remaining cylinders from the corresponding auxiliary intake passages is fed into the combustion chamber of the given cylinder which is in the intake stroke, the amount of the mixture fed into the combustion chamber of the given cylinder from the corresponding auxiliary intake passage becomes small. As a result, the mixture cannot flow at a high speed in the auxiliary intake passage which opens into the intake port of the given cylinder, and it is impossible to sufficiently promote the vaporization of fuel in the auxiliary intake passage of the given cylinder. In addition, since the intake manifold, that is, the main intake passage located downstream of the throttle valve of the carburetor, has a relatively large surface area, the amount of liquid fuel adhering onto the inner surface of the intake manifold is also large. Consequently, when the level of the vacuum in the intake manifold is rapidly increased, as in the case wherein an engine is decelerated, a large amount of the fuel adhering onto the inner surface of the intake manifold is instantaneously vaporized. As a result, an excessively rich mixture is temporarily fed into the cylinder, and there occurs a problem in that the amount of unburned HC in the exhaust gas is increased.

An object of the present invention is to provide an engine capable of promoting the vaporization of fuel and creating a strong swirl motion in the combustion chamber when the engine is operating under a light load, while ensuring a high volumetric efficiency when the engine is operating at a high speed under a heavy load.

According to the present invention, there is provided an internal combustion engine having a combustion chamber equipped with an intake valve; an intake passage connected to the combustion chamber via the intake valve; and a carburetor having a primary throttle valve arranged in the intake passage; wherein the improvement comprises at least one secondary throttle valve arranged in the intake passage at a position downstream of the primary throttle valve; and means for opening said at least one secondary valve in accordance with a reduction in the level of the vacuum in that portion of the intake passage which is located between the primary throttle valve and the secondary throttle valve; and at least one passage means communicating the portion of the intake passage located downstream of the secondary throttle valve with the portion of the intake passage located upstream of the secondary throttle valve.

The present invention may be more fully understood from the description of the preferred embodiments of the invention set forth below, together with the accompanying drawings.

DESCRIPTION OF PREFERRED EMBODIMENTS

Figure 1:
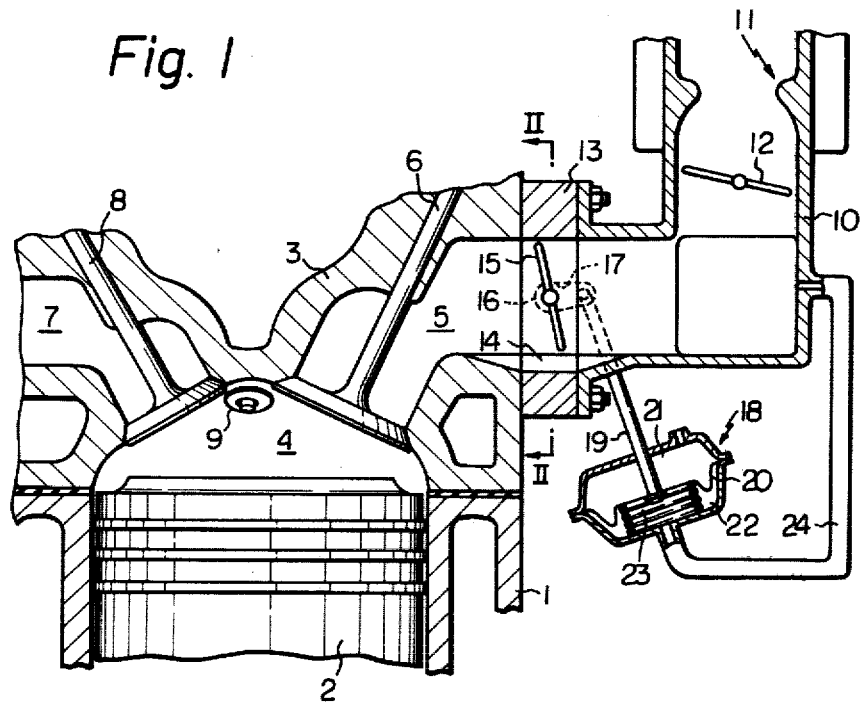
FIG. 1 is a cross-sectional side view of an embodiment of an engine according to the present invention.

Referring to FIG. 1, 1 designates a cylinder block, 2 a piston reciprocally movable in the cylinder block 1, 3 a cylinder head fixed onto the cylinder block 1, and 4 a combustion chamber formed between the top face of the piston 2 and the inner wall of the cylinder head 3; 5 designates an intake port formed in the cylinder head 3, 6 an intake valve, 7 an exhaust port and 8 an exhaust valve; 9 designates a spark plug, 10 an intake manifold, 11 a carburetor and 12 a throttle valve of the carburetor 11. The throttle valve 12 is connected to the accelerator pedal (not shown).

As is illustrated in FIG. 1, the intake manifold 10 is fixed onto the cylinder head 3 via a spacer member 13, and a groove 14 having a semi-circular cross-section (FIG. 2) is formed on the inner bottom wall of the spacer member 13. The groove 14 is so formed that it extends onto portions of the inner walls of the intake port 5 and the intake manifold 10 which are adjacent to the spacer member 13. In addition, a secondary throttle valve 15 is arranged in the spacer member 13. When the secondary throttle valve 15 is positioned at its fully closed position as illustrated in FIG. 1, the inside of the intake manifold 10 located upstream of the secondary throttle valve 15 is interconnected with the intake port 5 located downstream of the secondary throttle valve 15 only via the groove 14. An arm 17 is fixed onto a throttle shaft 16 of the secondary throttle valve 15, and a control rod 19 of a vacuum-operated diaphragm apparatus 18 is connected to the tip of the arm 17. The diaphragm apparatus 18 comprises an atmospheric pressure chamber 21 and a vacuum chamber 22 which are separated by a diaphragm 20. A compression spring 23 is inserted into the vacuum chamber 22 for always biasing the diaphragm 20 towards the atmospheric pressure chamber 21. The vacuum chamber 22 is connected to the intake manifold located downstream of the throttle valve 12 of the carburetor 11 via a vacuum conduit 24. In addition, the control rod 19 is connected to the diaphragm 20.

Figure 2:
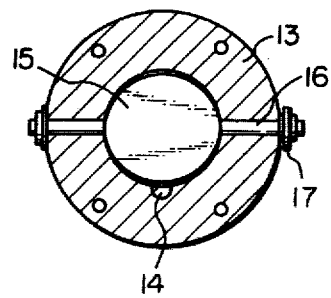
FIG. 2 is a cross-sectional view taken along line II—II in FIG. 1.

When the opening degree of the throttle valve 12 of the carburetor 11 is small and the engine is thus operating under a light load, the level of the vacuum produced in the intake manifold 10 is high. As a result of this, the level of vacuum in the vacuum chamber 22 becomes high, and the diaphragm 20 moves downwards against the spring force of the compression spring 23. The secondary throttle valve 15 is thus positioned at its fully closed position as illustrated in FIG. 1. Consequently, at this time, the mixture formed in the carburetor 11 is fed into the combustion chamber 4 via the groove 14 and the intake port 5. As is illustrated in FIG. 2, the groove 14 has an extremely small cross-sectional area. Consequently, since the mixture flows into the groove 14 at a high speed, flow energy is added to the mixture flowing in the groove 14; as a result, the vaporization of the liquid fuel contained in the mixture is promoted. The mixture passing through the groove 14 and spouted into the intake port 5 from the groove 14 flows into the combustion chamber 4 via the intake valve 6 at a relatively high speed; thus, a strong turbulence is caused in the combustion chamber 4. As a result of this, the burning velocity is considerably increased.

When the opening degree of the throttle valve 12 of the carburetor 11 is large and the engine is thus operating under a heavy load, the level of the vacuum in the intake manifold 10 is small, and the level of the vacuum produced in the vacuum chamber 22 is also small. Thus, the diaphragm 20 moves upwards due to the spring force of the compression spring 23; as a result, the secondary throttle valve 15 is fully opened. In the case wherein the secondary throttle valve 15 is arranged in the intake passage as illustrated in FIG. 1, the secondary throttle valve 15 and the throttle shaft 16 will cause an increase in the flow resistance to which the mixture flowing in the intake passage is subjected when the secondary throttle valve 15 is positioned at its fully opened position. However, in this embodiment, since the cross-sectional area of the intake passage is increased by the cross-sectional area of the groove 14, and flow resistance becomes extremely small; as a result, a high volumetric efficiency can be ensured when the engine is operating at a high speed under a heavy load.

Figure 3:
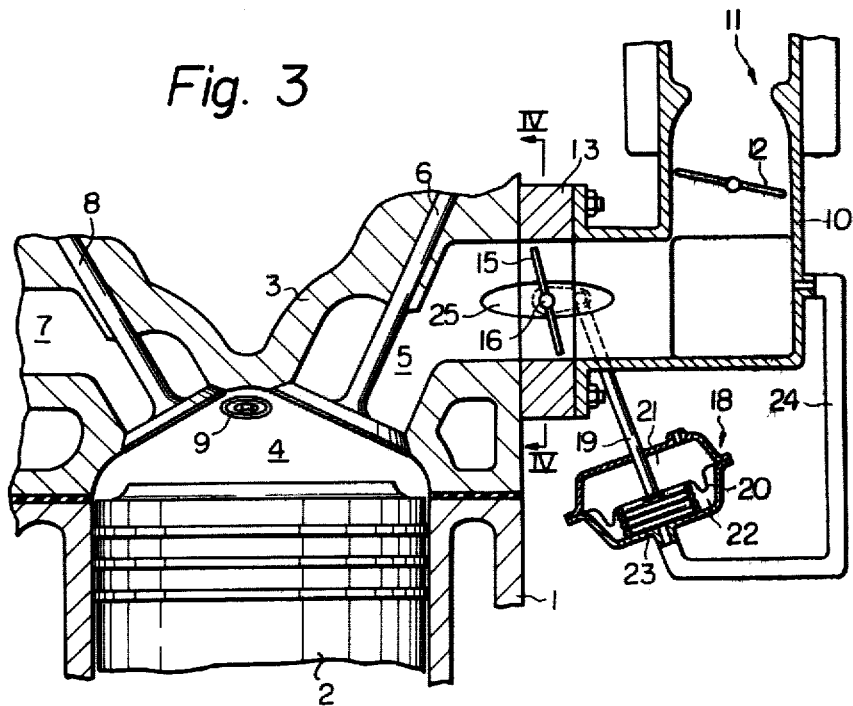
FIG. 3 is a cross-sectional side view of another embodiment according to the present invention.
Figure 4:
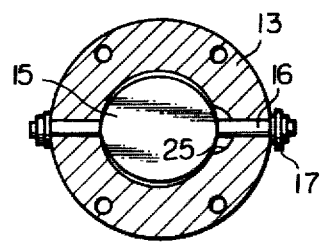
FIG. 4 is a cross-sectional view taken along line IV—IV in FIG. 3.

FIGS. 3 and 4 show another embodiment according to the present invention. In this embodiment, a groove 25 having a function which is the same as that of the groove 14 illustrated in FIG. 1 is formed on the inner side wall of the spacer member 13 at a position located around the throttle shaft 16.

Figure 5:
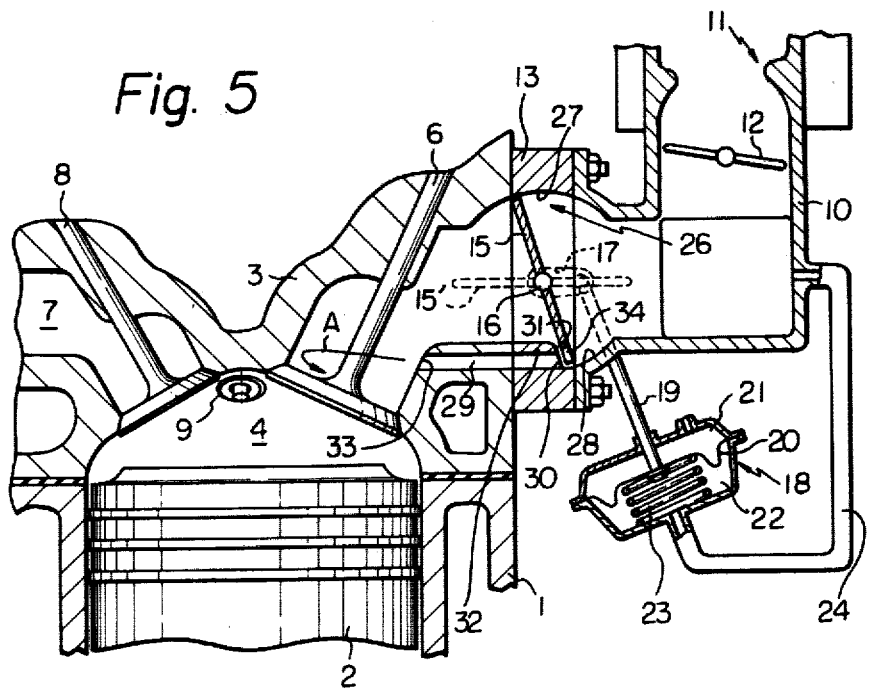
FIG. 5 is a cross-sectional side view of a further embodiment according to the present invention.
Figure 6:
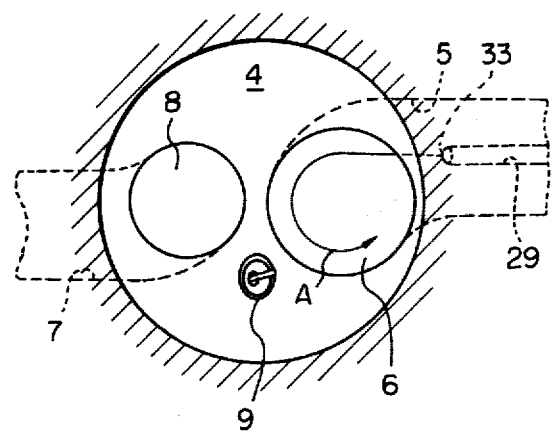
FIG. 6 is a bottom view of the cylinder head shown in FIG. 5.
Figure 7:
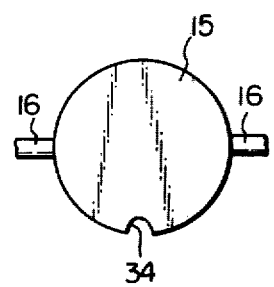
FIG. 7 is a front view of the secondary throttle valve shown in FIG. 5.

FIGS. 5 through 7 show a further embodiment according to the present invention. Referring to FIG. 5, an enlarged cross-sectional portion 26 is formed in the spacer member 13, and the secondary throttle valve 15 is arranged in the enlarged cross-sectional portion 26. The inner wall 27, 28 defining the enlarged cross-sectional portion 26 has a spherical shape for allowing the secondary throttle valve 15 to rotate smoothly. An auxiliary intake passage 29 is formed in the cylinder head 3 and the spacer member 13. This auxiliary intake passage 29 has an inlet 30 formed on a front wall 31 of a raised portion 32 which is formed on the spherically-shaped bottom wall 28. In addition, the auxiliary intake passage 29 has an outlet 33 formed on the inner wall of the intake port 5. The front wall 31 of the raised portion 32 is so arranged that it faces the lower end of the secondary throttle valve 15 when the secondary throttle valve 15 is positioned at its closed position as illustrated in FIG. 5. Consequently, a cut away portion 34 is formed on the lower end of the secondary throttle valve 15 at a position facing the inlet 30 as illustrated in FIGS. 5 and 7, so that the inlet 30 is not closed by the secondary throttle valve 15 when the secondary throttle valve 15 is positioned at its fully closed position as illustrated in FIG. 5. Consequently, when the secondary throttle valve 15 is positioned at its fully closed position, the intake port 5 is interconnected with the intake manifold 10 only via the auxiliary intake passage 29. As is illustrated in FIG. 6, the intake port 5 is formed so that it can be turned in the vicinity of the intake valve 6, and the outlet 33 of the auxiliary intake passage 29 is directed toward the circumferential inner wall of the intake port 5.

When the engine is operating under a light load, the secondary throttle valve 15 is positioned at its fully closed position. At this time, the mixture formed in the carburetor 11 is fed into the combustion chamber 4 via the cut away portion 34 of the secondary throttle valve 15 and via the auxiliary intake passage 29 and the intake port 5. As is illustrated in FIG. 5, the auxiliary intake passage 29 has an extremely small cross-sectional area. Consequently, since the mixture flows in the auxiliary intake passage 29 at a high speed, the vaporization of the liquid fuel is promoted. Then the mixture flows into the intake port 5 from the auxiliary intake passage 29 at a high speed. Since the outlet 33 of the auxiliary intake passage 29 is directed to the circumferential inner wall of the intake port 5, the mixture flowing out from the auxiliary intake passage 29 swirls in the intake port 5 as shown by the arrow A in FIG. 5. The swirling mixture then flows into the combustion chamber 4 via the intake valve 6; thus, a strong swirl motion is caused in the combustion chamber 4. As a result of this, the burning velocity is considerably increased.

When the engine is operating under a heavy load, the secondary throttle valve 15 is fully opened as shown by the broken line 15' in FIG. 5. Consequently, at this time, a large part of the mixture formed in the carburetor 11 flows into the combustion chamber 4 via the intake port 5 having a small flow resistance. As is described with reference to FIG. 1, the secondary throttle valve 15 and the throttle shaft 16 will cause an increase in the flow resistance of the intake passage. However, in this embodiment, since the cross-sectional area of the intake passage located around the secondary throttle valve 15 is enlarged as illustrated in FIG. 5, the flow resistance becomes extremely small; as a result, a high volumetric efficiency can be ensured when the engine is operating at a high speed under a heavy load.

In each of the above-described embodiments, it is preferable that the secondary throttle valve 15 be arranged as near the intake valve 6 as possible, so that the inner surface area of the intake passage located downstream of the secondary throttle valve 15 is minimized. Consequently, even if the liquid fuel adhering to the inner wall of the intake passage located downstream of the secondary throttle valve 15 is instantaneously vaporized when the throttle valve 12 of the carburetor 11 is abruptly closed, the amount of fuel instantaneously vaporized is small; as a result, it is possible to prevent the mixture fed into the cylinder from becoming excessively rich. In addition, when the engine is operating under a light load, since the intake port 5 is connected to the intake manifold 10 only via the groove 14, 25 or the auxiliary intake passage 29, both of which have an extremely small cross-sectional area, it is possible to suppress the intake interference. In addition, when the engine is operating under a light load, since the mixture is caused to flow at a high speed in the groove 14, 25 or the auxiliary intake passage 29, the vaporization of fuel can be promoted. In addition, it is possible to cause a strong turbulence in the combustion chamber 4.

According to the present invention, as mentioned above, since the burning velocity can be increased over the entire range of operating conditions of an engine, a stable combustion can be ensured, the amount of harmful components in the exhaust gas can be reduced, and the fuel consumption can also be improved.

While the invention has been described with reference to specific embodiments chosen for purposes of illustration, it should be apparent that numerous modifications could be made thereto by those skilled in the art without departing from the spirit and scope of the invention.

What is claimed is:

1. An internal combustion engine having a combustion chamber equipped with an intake valve, an intake passage connected to the combustion chamber via the intake valve, a carburetor having a primary throttle valve arranged in said intake passage, a secondary throttle valve arranged in said intake passage at a position downstream of said primary throttle valve, means for opening said secondary throttle valve in accordance with a reduction in the level of vacuum in the portion of said intake passage which is located between said primary throttle valve and said secondary throttle valve, and an auxiliary passage having an outlet opening into the portion of said intake passage located downstream of said secondary throttle valve and an inlet communicating with the portion of said intake passage located upstream of said secondary throttle valve, wherein the improvement comprises:

the cross-sectional area of a portion of the intake passage at the position of the secondary throttle valve is enlarged relative to the cross-sectional areas of the intake passage immediately upstream and immediately downstream of said enlarged passage portion, the amount of enlargement being sufficient to compensate for the flow resistance of said secondary throttle valve when said secondary throttle valve is in the fully open position, whereby the secondary throttle valve can divert the flow of intake gas into the auxiliary intake passage when the engine is operating under light load without reducing the volumetric efficiency when the engine is operating under heavy load;

the intake passage further comprises a raised portion having a front wall formed on the bottom of said enlarged passage portion, the inlet of said auxiliary passage being formed in the front wall of said raised portion; and said secondary throttle valve has a cut away portion formed in the periphery thereof in alignment with the inlet of said auxiliary passage when said secondary throttle valve is in its fully closed position.

2. An internal combustion engine as claimed in claim 1, wherein said auxiliary passage has an extremely small cross-sectional area as compared with that of said intake passage.

3. An internal combustion engine as claimed in claim 1, wherein said enlarged passage portion has a spherical shape.

4. An internal combustion engine as claimed in claim 2, wherein the outlet of said auxiliary passage is directed to a circumferential wall of said intake passage for creating a swirl motion in said intake passage.

5. An internal combustion engine as claimed in claim 1, wherein said engine further comprises an intake manifold, a cylinder head and a spacer member arranged between said intake manifold and said cylinder head, said secondary throttle valve being arranged in said spacer member.

6. An internal combustion engine as claimed in claim 1, wherein said means for opening said secondary throttle valve comprises a vacuum-operated diaphragm apparatus connected to said secondary throttle valve.

7. An internal combustion engine as claimed in claim 6, wherein said diaphragm apparatus comprises a diaphragm connected to said secondary throttle valve and a vacuum chamber connected to said intake passage.

* * * * *